(12) United States Patent
Glick et al.

(10) Patent No.: US 6,275,780 B1
(45) Date of Patent: Aug. 14, 2001

(54) ROTATIONAL AXIS DETERMINATION FROM PHOTOGRAMMETRIC DATA

(75) Inventors: Gary L. Glick, Torrance; Donald L. Jones, Marina Del Rey, both of CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/119,679

(22) Filed: Jul. 21, 1998

(51) Int. Cl.[7] ........................................................ G01P 3/38
(52) U.S. Cl. ............................................. 702/145; 378/901
(58) Field of Search ................................... 702/145, 151, 702/98, 95, 152; 356/376, 462, 28, 4, 459, 12; 378/901; 33/1 M, 1 PT, 1 T; 703/1; 701/301

(56) References Cited

U.S. PATENT DOCUMENTS

| | | | |
|---|---|---|---|
| 4,643,574 | * 2/1987 | Muller | 356/350 |
| 5,294,972 | * 3/1994 | Kemmler | 356/350 |
| 5,552,883 | * 9/1996 | Busch-Vishniac et al. | 356/139.03 |
| 5,719,674 | * 2/1998 | Martin et al. | 356/350 |
| 5,758,429 | * 6/1998 | Farzan et al. | 33/503 |
| 5,963,613 | * 10/1999 | Navab | 378/4 |

* cited by examiner

*Primary Examiner*—Marc S. Hoff
*Assistant Examiner*—Edward Raymond
(74) *Attorney, Agent, or Firm*—Robert W. Keller

(57) ABSTRACT

An apparatus and method for computing the average axis of rotation for a rotational device utilizes photogrammetric data derived from a rotational device in conjunction with an iterative algorithm to determine the average axis of rotation within a desired resolution. The input photogrammetric data is determined by photogrammetry. In particular, a target plate including a plurality of targets is installed on each rotational axis, the targets are photogrammetrically measured at an initial rotational position, the target plate is rotated to a different position and the targets are photogrammetrically measured at the new position. As the measurement process is repeated for different positions, the present invention transforms each set of photogrammetric measurements from each rotational position into a common coordinate system to generate photogrammetric data points and inputs each set of data points from each rotational position into the algorithm to determine the average axis of rotation of the device within a desired resolution. The algorithm, via an iterative process, calculates the average axis of rotation from the input photogrammetric data by assigning each photogrammetric data point a unique identification, determining vectors based upon data points positioned approximately 180 degrees apart and determining the average axis of rotation by the resulting vectors' rotation about the drive axis.

20 Claims, 3 Drawing Sheets

ROTATIONAL AXIS DETERMINATION FROM PHOTOGRAMMETRIC DATA

BACKGROUND OF THE INVENTION

The present invention relates generally to photogrammetry, and more particularly to rotational axis determination utilizing photogrammetric data.

The successful operation of certain rotating devices, such as a flight dual axis drive for positioning antennas, is dependent largely on the ability to maintain proper alignment of the device about its rotational axis. To maintain such alignment, data related to the average axis of rotation must typically be collected. Conventional techniques for determining the average axis of rotation are generally ineffective and inaccurate. Even in the absence of such problems, these techniques rely upon manual operation and repeated readings, and are thus extremely slow. For example, optical instruments, such as multiple theodolites, are typically utilized in conjunction with mirrors to measure the average axis of rotation. A conventional theodolite typically includes a telescope, mounted to be rotatable about vertical and horizontal axis, and horizontal and vertical circular is scales against which the angular position of the telescope can be measured, after it has been aligned on a remote target. Data representing the bearing or azimuthal direction of the target from the theodolite location and elevational angle of the target above or below the horizontal is attained. This technique, however, requires a human observer to both align the telescope on the target and read the azimuthal and elevational data from the circular scales. Since manual operation and repeated readings are required, this technique is extremely slow (typically requiring 4 to 6 weeks), costly and subject to error.

What is needed therefore is an apparatus and method which is accurate and time and cost efficient for determining the average axis of rotation for a rotational device.

SUMMARY OF THE INVENTION

The preceding and other shortcomings of the prior art are addressed and overcome by the present invention which provides, in a first aspect, an apparatus and method for computing the average axis of rotation for a rotational device which utilizes photogrammetric data derived from a rotational device in conjunction with an iterative algorithm to determine the average axis of rotation within a desired resolution. The input photogrammetric data is determined by photogrammetry. In particular, a target plate including a plurality of targets is installed on each rotational axis, the targets are photogrammetrically measured at an initial rotational position, the target plate is rotated to a different position and the targets are photogrammetrically measured at the new position. As the measurement process is repeated for different positions, the present invention transforms each set of photogrammetric measurements from each rotational position into a common coordinate system to generate photogrammetric data points and inputs each set of data points from each rotational position into the algorithm to determine the average axis of rotation of the device within a desired resolution. The algorithm, via an iterative process, calculates the average axis of rotation from the input photogrammetric data by assigning each photogrammetric data point a unique identification, determining vectors based upon data points positioned approximately 180 degrees apart and determining the average axis of rotation by the resulting vector's rotation about the drive axis.

The foregoing and additional features and advantages of this invention will become apparent from the detailed description and accompanying drawing figures below. In the figures and the written description, numerals indicate the various features of the invention, like numerals referring to like features throughout both the drawing figures and the written description.

DETAILED DESCRIPTION OF THE PREFERRED EMBODIMENTS

Figure 1:
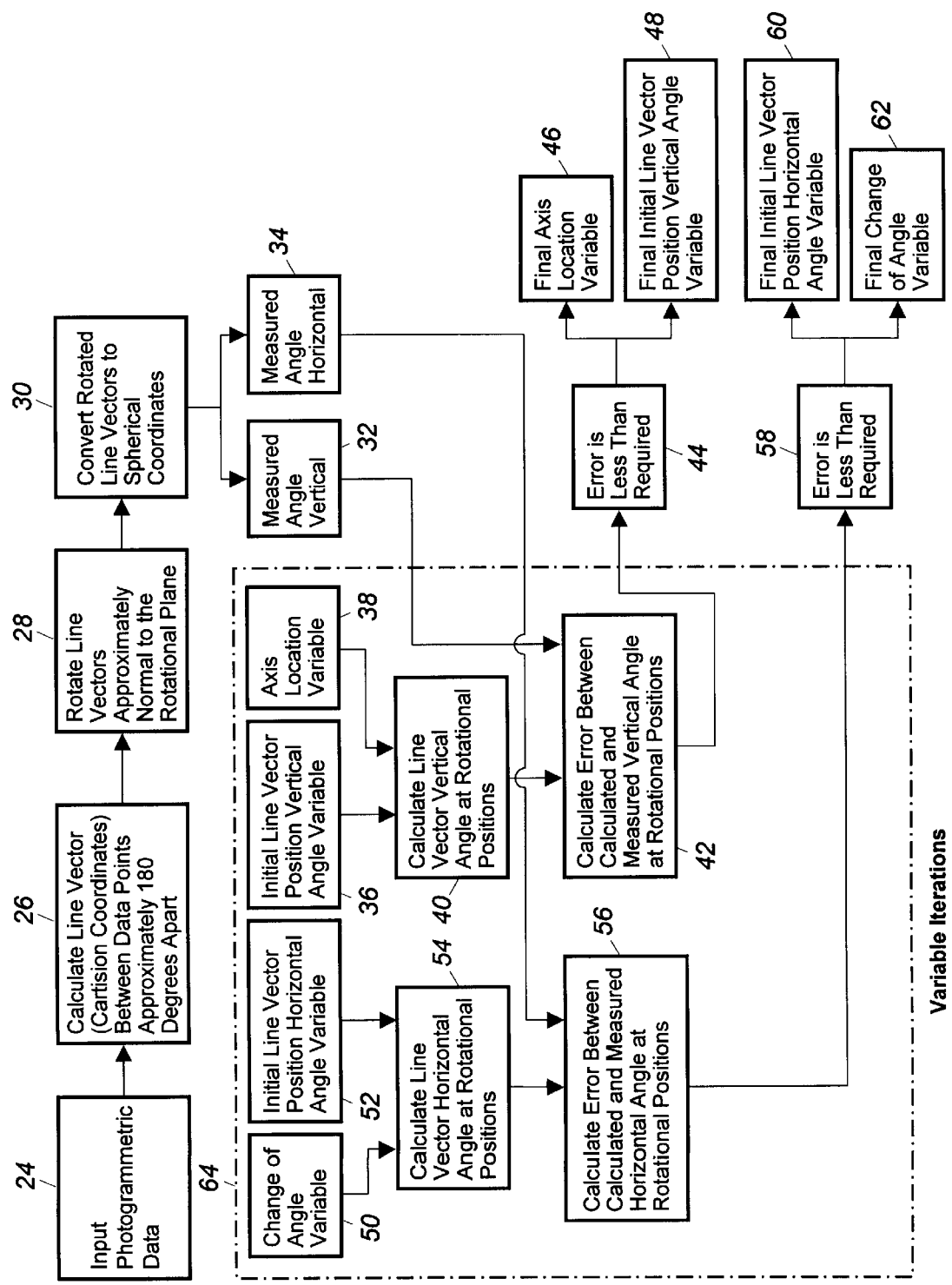
FIG. 1 is a flowchart of an algorithm for computing the average axis of rotation from input photogrammetric data for a dual axis rotational device in accordance with a preferred embodiment of the invention.
Figure 2:
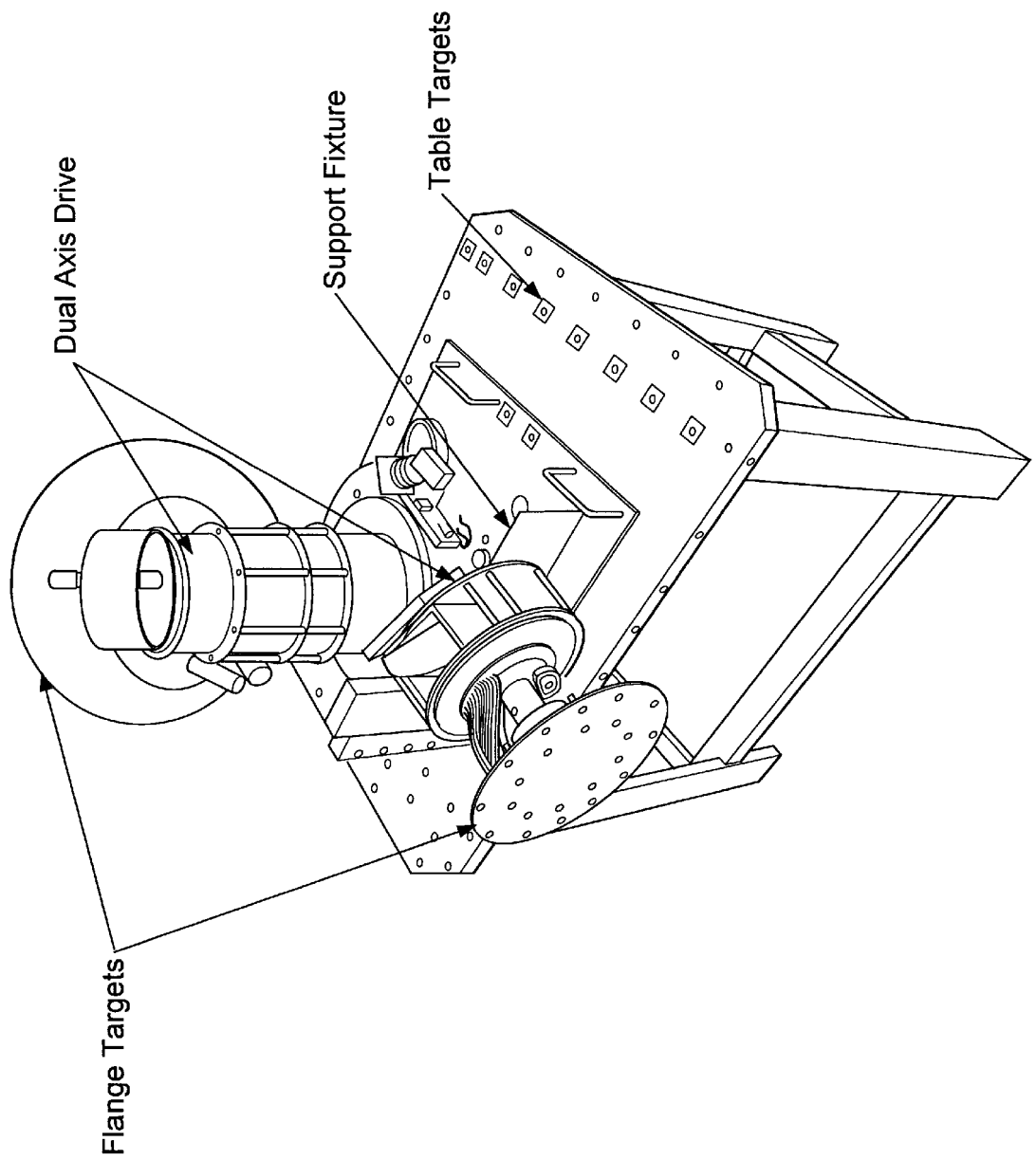
FIG. 2 is a perspective view of a dual axis rotational device including photogrammetric targets which in conjunction with the algorithm illustrated in FIG. 1 may be utilized to determine the average axis of rotation in accordance with the preferred embodiment of the invention.
Figure 3:
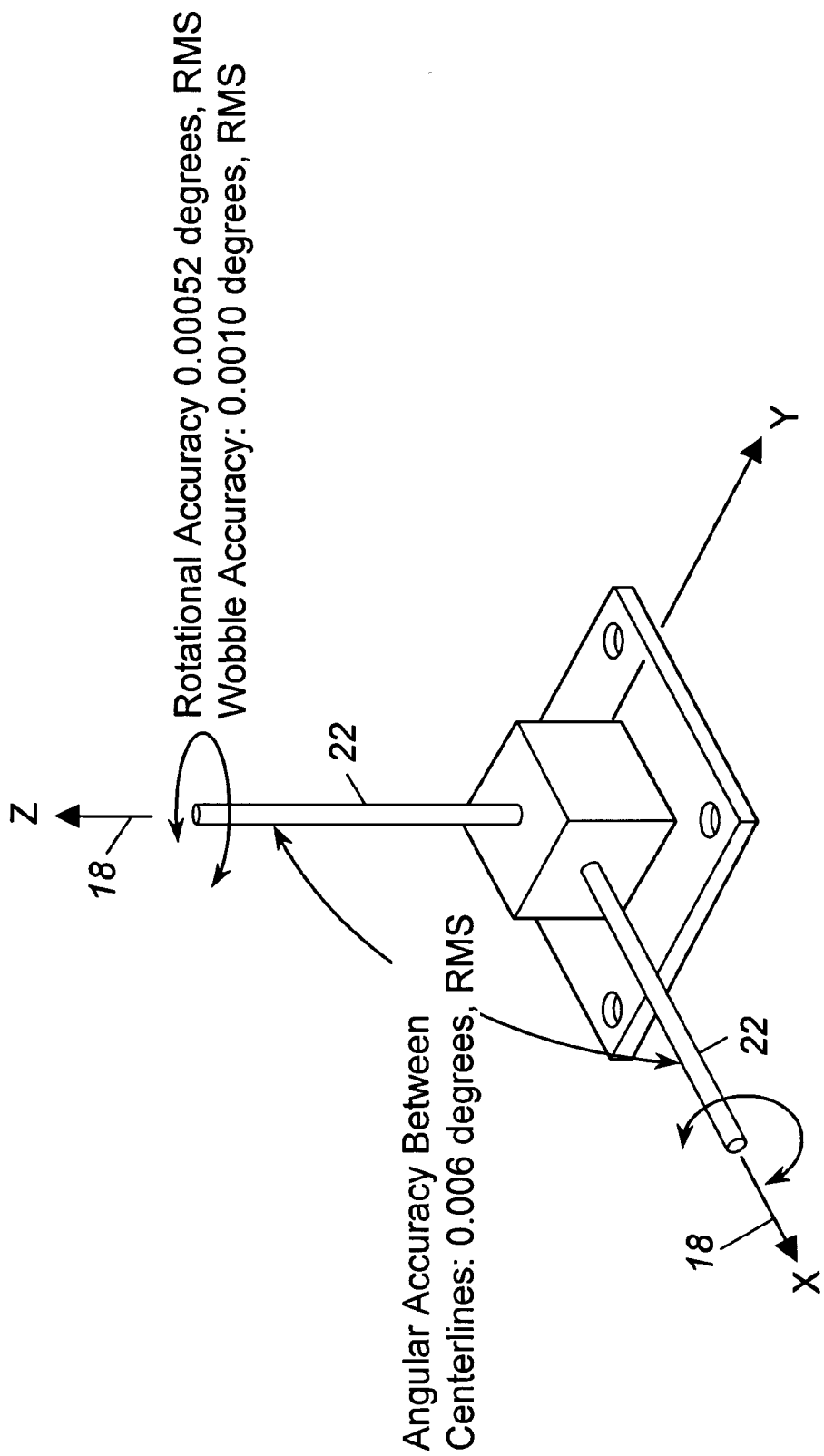
FIG. 3 is a simplified perspective view of the dual axis rotational device illustrated in FIG. 2.

As is illustrated in FIGS. 1–3, an apparatus and method for computing the average axis of rotation for a rotational device utilizes photogrammetric data derived from a rotational, device in conjunction with an iterative algorithm to determine the average axis of rotation within a desired resolution is illustrated. As is illustrated in FIGS. 2 and 3, the input photogrammetric data is preferably determined by a photogrammetric technique. In particular, a target plate 16 including a plurality of targets 14 is installed on each rotational axis 18 to be measured and the targets 14 are photogrammetrically measured at an initial rotational position. The target plate 16 is then rotated to a different position and the targets 14 are photogrammetrically measured at the new position. As the measurement process is repeated for different positions, the present invention transforms each set of photogrammetric measurements from each rotational position into a common coordinate system to generate photogrammetric data points which are applied to the algorithm 10 of the present invention to determine the average axis of rotation of the device 12 within a desired resolution. As is illustrated in FIG. 1 and discussed in detail below, the algorithm 10 of the present invention, via an iterative process, calculates the average axis of rotation from the input photogrammetric data by assigning each photogrammetric data point a unique identification, determining vectors based upon data points positioned approximately 180 degrees apart and determining the average axis of rotation by the resulting vectors' rotation about the drive axis 18.

The present invention may be utilized for determining the average axis of rotation for many different applications, including but not limited to, flight dual axis drives for positioning antennas, power plant generators, propellers for ships, high precision motors and race cars for determining parallelism between wheel or wheel bearing wobble. Although the algorithm 10 of the present invention calculates the average axis of rotation in response to input photogrammetric data, the algorithm 10 may be adapted to calculate the average axis of rotation in response to input data derived via existing and newly developed methods other than photogrammetry. Additionally, the present invention may be utilized to determine various parameters other than the average axis of rotation, including but not limited to, the axis wobble (the movement of a rotating body which that body performs relative to its axis of rotation), change of angle around a rotational axis 18 and orthogonality between dual axis drives 10.

In accordance with the preferred embodiment of the present invention, the input data points which are applied to the algorithm 10 illustrated in FIG. 1 are determined by photogrammetry. Photogrammetry involves the collection of images, either film or digital, from geometrically varied positions. In particular, two-dimensional measurements of discrete, identifiable points on the images are taken and then reduced analytically to three-dimensional coordinates. These coordinates can be determined to an accuracy range of:

1:100,000 (0.001" RMS over a 100" Length)
1:1,000,000 (0.001" RMS over a 1000" Length)

The three-dimensional coordinates are analyzed by the algorithm 10 of the present invention, illustrated in FIG. 1, to determine the average axis of rotation for a rotational device 12.

Referring to FIG. 2, a dual axis rotational device 12 having a rotating drive disposed on each of orthogonally disposed axis 18 is illustrated. The input photogrammetric data is derived from initially installing a target plate 16 on the rotational axis 18 to be measured. The target plate 16 includes a plurality of well-defined targets 14 mounted and equally spaced about the target plate 16. Only the targets 14 are measured during the photogrammetric process. The targets 14 may be substantially circularly-shaped and manufactured from a reflective material and having an adhesive backing to ensure that they do not move during the photogrammetric process. In particular, reflective material is deposited on one side of the base of the target, with an adhesive deposited on the other side of the base. In a typical embodiment, the targets 14 have a diameter of about 0.375 inch (0.926 cm), thickness of about 0.005 inch (0.013 cm) and backing manufactured from Kapton™ breaker tape base. The targets 14 are affixed to the target plate 16, spaced about 7 inches (17.78 cm) from each other around the perimeter of the target plate 16. The targets 14 utilized for measurement need not be manufactured as described above, and may be, for example, manufactured from phosphorescent material or plain white paper. The latter paper could be utilized as long as reflections from other objects in the vicinity of the targets 14 are carefully monitored.

Photography, either film or digital, is taken from the appropriate locations. In particular, the targets 14 are photogrammetrically measured with the rotating device 12 including the target plate 16 at an initial rotational position. The precise two-dimensional positions of the targets 14 are measured on each image at each drive rotational position. In a video-based system, this can be accomplished in near real time to sub-micron precision on the image plane.

The drive is then rotated a desired number of degrees to a different position and the targets 14 are photogrammetrically measured at the new position. In a typical configuration, for a drive having a 180 degree maximum rotation, the drive is typically rotated six to nine times. In accordance with the present invention, photogrammetric surveys of the target are taken at each position the drive is rotated. In particular, the precise two-dimensional positions of the targets 14 are measured on each image. In a video-based system, this can be accomplished in near real time to sub-micron precision on the image plane. The two-dimensional measurements collected are analytically reduced to obtain precision three-dimensional coordinates for each target. In particular, each set of photogrammetric measurements from each rotational position is transformed into a common coordinate system to generate photogrammetric data points. The resulting three-dimensional coordinates are analyzed to obtain the required information. Each set of data points from each rotational position is applied to the algorithm 10 of the present invention to determine the average axis of rotation of the device 12 within a desired resolution as described in detail below.

As is illustrated in FIG. 1, the algorithm 10 in the form of a flow chart is utilized to calculate the average axis of rotation from the input data. In particular, in step 24, the photogrammetric data is applied to the algorithm 10. Line vectors in a Cartesian coordinate system, formed by data points located approximately 180 is degrees apart are then calculated (step 26). For example, a vector is formed from the ith and jth target which are positioned 180 degrees apart from each other. The line vectors formed are then rotated approximately normal to the rotational plane (step 28). The rotated line vector is then converted to spherical coordinates (step 30) to generate an angle horizontal and angle vertical (steps 32 and 34) which are then applied to the iterative portion 64 of the algorithm 10.

Referring to FIG. 1, the iterative portion 64 of the algorithm 10 creates a model based upon predicted variables, i.e. the initial line vector positions vertical angle variable (step 36), axis location variable (step 38), change of angle variables (step 50) and initial line vector position horizontal angle variable (step 52). In accordance with the present invention, the algorithm model is compared to the measured values from the photogrammetric process, via an iterative process 64, to determine the above variables within a desired error value. Although the photogrammetric process generates a plurality of points with which line vectors between points positioned 180 degrees apart are formed, there is no established axis for the line vectors. The axis 18 is determined from applying the line vectors to the algorithm 10 of the present invention, which compares the measured values with the predicted variables. If the error between the predicted and measured values is not within the desired error limit, the iterative process allows the predicted variables to be changed until the variables falls within the desired error limit. Since the algorithm 10 may be utilized to determine the orthogonality between two axis 18, it is desirable to determine where the axis 18 are in space, and the orthogonality between the two axis 18. In a typical configuration, the axis 18 are desired to be positioned as close to 90 degrees as possible, with a deviation of +/−0.02 degrees. The desired deviation or error limit is not critical to the operation of the present invention, however.

In particular, as is illustrated in FIG. 1, the iterative portion 64 of the algorithm 10 calculates a line vector vertical angle at rotational positions and then compares the calculated angle vertical to the measured angle vertical (step 32) from the photogrammetric process. The calculated line vector vertical angle at rotational positions (step 40) is derived from the model based upon a predicted initial line vector positions vertical angle variable (step 36) and axis location variable (step 38). In particular, the predicted initial line vector positions vertical angle variable (step 36) is the prediction of the initial start position of the line vector position for the vertical angle and the axis location variable (step 38) is a prediction of the location of the axis 18 in space. The error between the calculated and measured vertical angle at rotational positions is computed (step 42). If the error falls within the desired error limit (step 44), the final axis location variable (step 46) and final initial line vector position vertical angle variable (step 48) are determined. If the error falls outside of the desired error limit (step 44), the algorithm 10 adjusts the input line vector positions vertical angle variable (step 36) and axis location variable (step 38) and reexecutes steps 36 through 44 until the error falls within the desired error limit (step 44), typically 0.01 degrees.

Similarly, the iterative portion 64 of the algorithm 10 calculates a line vector horizontal angle at rotational positions (step 54) and then compares the calculated angle horizontal to the measured angle horizontal from the photogrammetric process (step 56). The calculated line vector horizontal angle at rotational positions (step 54) is derived from model based upon a predicted initial line vector positions horizontal angle variable (step 50) and change of angle axis location variable (step 52). In particular, the predicted initial line vector positions horizontal angle variable (step 52) is the prediction of the initial start position of the line vector position for the horizontal angle and the change of angle axis location variable (step 50) is a prediction of the rotational increment, for example 18 degrees. The error between the calculated and measured horizontal angle at rotational positions is computed (step 56). If the error falls within the desired error limit (step 58), the final initial line vector position horizontal angle variable (step 60) and final change of angle variable (step 62) are determined. If the error in step 58 falls outside of the desired error limit, the algorithm 10 adjusts the input line vector positions horizontal angle variable (step 50) and axis location variable (step 52) and reexecutes steps 50 through 58 until the error falls within the desired error limit (step 58), typically 0.01 degrees.

As is illustrated in the simplified schematic 20 of the device 12 in FIG. 3, the rotating members 22 are positioned about the x and z axis 18. In a typical configuration, the desired rotational and wobble accuracy of the rotating members 20 about either the x or z axis 18 is about 0.00052 degrees RMS and 0.0010 degrees RMS, respectively. The typical desired angular accuracy between the centerlines of the x and z axis 18 is 0.006 degrees RMS.

The present invention is not limited to the measurement of the rotational axis of a dual axis drive as illustrated in FIG. 2, but rather may be adapted to determine the same parameter for a single or multiple axis drive.

It will be appreciated by persons skilled in the art that the present invention is not limited to what has been shown and described herein above, nor the dimensions of sizes of the physical implementation described immediately above. The scope of invention is limited solely by the claims which follow.

What is claimed is:

1. An apparatus for determining an average axis of rotation for a rotational device having at least one axis, comprising:
    means for generating data points related to the rotational position of said rotational device; and
    means for determining the axis of rotation for said rotational device based on said data points.

2. The apparatus claimed in claim 1, wherein said means for generating data points related to the rotational position of said rotational device, further comprises:
    means for photogrammetrically determining said data points related to the rotational position of said rotational device.

3. The apparatus claimed in claim 2, wherein said means for photogrammetrically determining said data points related to the rotational position of said rotational device, further comprises:
    a target device positioned substantially perpendicular to said axis of said rotational device;
    a plurality of targets mounted on said target device;
    means for rotating said rotational device about its axis; and
    means for photogrammetrically measuring said targets as said rotational device is rotated about its axis.

4. The apparatus claimed in claim 3, wherein said targets provide reflection during measurement.

5. The apparatus claimed in claim 3, wherein said means for photogrammetrically measuring said targets as said rotational device is rotated about its axis, further comprises:
    means for providing two-dimensional measurements of said targets;
    means for generating three-dimensional measurements of said targets in response to said two-dimensional measurements; and
    means for generating said data points in response to said three-dimensional measurements.

6. The apparatus claimed in claim 1, wherein said means for determining the axis of rotation for said rotational device based on said data points, further comprises:
    means for determining measured values related to the axis of rotation based upon said data points.

7. The apparatus claimed in claim 6, wherein said means for determining the axis of rotation for said rotational device based on said data points, further comprises:
    means for predicting values related to said axis position; and
    means for comparing said predicted values to said measured values to determine said axis of rotation.

8. The apparatus claimed in claim 7, wherein said means for determining measured values related to the axis of rotation based upon said data points, further comprises:
    means for determining vectors based upon data points positioned approximately 180 degrees apart.

9. The apparatus claimed in claim 8, wherein said means for comparing said predicted values to said measured values to determine said axis of rotation, further comprises:
    means for predicting initial vector position, axis location and change of angle variables; and
    means for comparing said initial vector position, axis location and change of angle variables to said vectors until a desired resolution is met.

10. The apparatus claimed in claim 9, wherein said means for comparing said initial vector position, axis location and change of angle variables to said vectors until a desired resolution is met, further comprises:
    means for adjusting said initial vector position, axis location and change of angle variables until a desired resolution is met.

11. A method for determining an average axis of rotation for a rotational device having at least one axis, comprising the steps of:
    generating data points related to the rotational position of said rotational device; and
    determining said axis of rotation for said rotational device based on said data points.

12. The method claimed in claim 11, wherein step of generating data points related to the rotational position of said rotational device, further comprises the step of:
    photogrammetrically determining said data points related to the rotational position of said rotational device.

13. The method claimed in claim 12, wherein said step of photogrammetrically determining said data points related to the rotational position of said rotational device, further comprises the steps of:
    mounting a plurality of targets on said target device;

rotating said rotational device about its axis; and photogrammetrically measuring said targets as said rotational device is rotated about its axis.

14. The method claimed in claim 13, wherein said targets provide reflection during measurement.

15. The method claimed in claim 13, wherein said step of photogrammetrically measuring said targets as said rotational device is rotated about its axis, further comprises the steps of:

providing two-dimensional measurements of said targets;

generating three-dimensional measurements of said targets in response to said two-dimensional measurements; and generating said data points in response to said three-dimensional measurements.

16. The method claimed in claim 11, wherein said step of determining the axis of rotation for said rotational device based on said data points, further comprises the step of:

determining measured values related to the axis of rotation based upon said data points.

17. The method claimed in claim 16, wherein said step of determining the axis of rotation for said rotational device based on said data points, further comprises the steps of:

predicting values related to said axis position; and comparing said predicted values to said measured values to determine said axis of rotation.

18. The method claimed in claim 17, wherein said step of determining measured values related to the axis of rotation based upon said data points, further comprises the step of:

determining vectors based upon data points positioned approximately 180 degrees apart.

19. The method claimed in claim 18, wherein said step of comparing said predicted values to said measured values to determine said axis of rotation, further comprises the steps of:

predicting initial vector position, axis location and change of angle variables; and comparing said initial vector position, axis location and change of angle variables to said vectors until a desired resolution is met.

20. The method claimed in claim 19, wherein said step of comparing said initial vector position, axis location and change of angle variables to said vectors until a desired resolution is met, further comprises the step of:

adjusting said initial vector position, axis location and change of angle variables until said desired resolution is met.

* * * * *